(12) United States Patent
Choi

(10) Patent No.: US 10,794,254 B2
(45) Date of Patent: Oct. 6, 2020

(54) UREA INJECTION CONTROL METHOD IN EXHAUST AFTERTREATMENT SYSTEM

(71) Applicants: HYUNDAI MOTOR COMPANY, Seoul (KR); KIA MOTORS CORPORATION, Seoul (KR)

(72) Inventor: Yoon Sung Choi, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/191,766

(22) Filed: Nov. 15, 2018

(65) Prior Publication Data

US 2020/0040785 A1 Feb. 6, 2020

(30) Foreign Application Priority Data

Jul. 31, 2018 (KR) .................. 10-2018-0089250

(51) Int. Cl.
*F01N 3/20* (2006.01)
*F01N 3/035* (2006.01)
*B01D 53/94* (2006.01)

(52) U.S. Cl.
CPC .......... *F01N 3/208* (2013.01); *B01D 53/9418* (2013.01); *B01D 53/9495* (2013.01); *F01N 3/035* (2013.01); *B01D 2251/2067* (2013.01); *B01D 2257/404* (2013.01); *B01D 2258/012* (2013.01); *F01N 2250/02* (2013.01); *F01N 2560/021* (2013.01); *F01N 2610/02* (2013.01); *F01N 2900/0404* (2013.01); *F01N 2900/1602* (2013.01); *F01N 2900/1616* (2013.01)

(58) Field of Classification Search
CPC .... F01N 3/208; F01N 3/035; F01N 2560/021; F01N 2610/02; F01N 2900/0404; F01N 2250/02; F01N 2900/1602; F01N 2900/1616; B01D 53/9418; B01D 53/9495; B01D 2258/012; B01D 2257/404; B01D 2251/2067
See application file for complete search history.

(56) References Cited

U.S. PATENT DOCUMENTS 8,745,970 B2* 6/2014 Gonze .................. F01N 3/035
 60/274
2006/0254258 A1* 11/2006 Blakeman .......... B01D 53/9431
 60/286

(Continued)

*Primary Examiner* — Matthew T Largi
(74) *Attorney, Agent, or Firm* — Brinks Gilson & Lione

(57) ABSTRACT

A urea injection control method in an exhaust after-treatment system includes: performing an ammonia slip prevention logic that adjusts a urea injection amount based on the highest temperature during a predetermined period of time from an end point of filter regeneration to a thermal equilibrium point when a temperature of a selective catalytic reduction (SCR) catalyst is higher than or equal to a predetermined threshold temperature at the end point of the filter regeneration; and adjusting a urea injection amount based on an ammonia storage amount map when the temperature of the SCR catalyst is lower than or equal to the predetermined threshold temperature at the end point of the filter regeneration. In particular, the thermal equilibrium point is a point at which a temperature of a filter is close or equal to an exhaust gas temperature.

5 Claims, 5 Drawing Sheets

(56) References Cited

U.S. PATENT DOCUMENTS

| | | | |
|---|---|---|---|
| 2007/0277507 A1* | 12/2007 | Yan | B01D 53/9418 60/286 |
| 2011/0265457 A1* | 11/2011 | Sato | F01N 3/2066 60/285 |
| 2013/0058833 A1* | 3/2013 | Onodera | F01N 3/035 422/111 |
| 2013/0064719 A1* | 3/2013 | Wakamatsu | F01N 11/002 422/108 |
| 2016/0061085 A1* | 3/2016 | Nagaoka | F01N 13/009 60/274 |
| 2016/0258331 A1* | 9/2016 | Ricci | F01N 3/208 |

* cited by examiner ced urea injection

UREA INJECTION CONTROL METHOD IN EXHAUST AFTERTREATMENT SYSTEM

CROSS-REFERENCE TO RELATED APPLICATION

This application claims priority to and the benefit of Korean Patent Application No. 10-2018-0089250, filed on Jul. 31, 2018, the entire contents of which are incorporated herein by reference.

FIELD

The present disclosure relates to a urea injection control method in an exhaust after-treatment system, and more particularly, to a control method of a selective catalytic reduction (SCR) system.

BACKGROUND

The statements in this section merely provide background information related to the present disclosure and may not constitute prior art.

In recent years, emission regulations of internal combustion engines have become stricter, and a variety of exhaust after-treatment systems for emission regulations have been researched and developed.

A filter is designed to remove particulate matter (PM) or soot. When a differential pressure between an upstream end and a downstream end of the filter is greater than or equal to a predetermined threshold value as the amount of PM or soot accumulated in the filter increases, a regeneration process is performed to burn off the accumulated PM or soot, which is known as filter regeneration. A filter regeneration temperature may be relatively high in a range of approximately 650° C. to 750° C.

The filter may be a diesel particulate filter (DPF) or a DPF with selective catalytic reduction (SCR) coating. The DPF includes a porous ceramic matrix having a plurality of parallel passages through which the exhaust gas passes. The SDPF may be designed by coating a DPF with an SCR catalyst (typically Cu-zeolite or Fe-zeolite), in which SCR and DPF functions are integrated. The SDPF allows ammonia ($NH_3$) and nitrogen oxides ($NO_x$) in the exhaust gas to react with the SCR catalyst to convert $NO_x$ into $N_2$ and water. In addition, the SDPF collects PM or soot contained in the exhaust gas.

An SCR system is designed to allow a reductant such as urea to react with $NO_x$ to thereby reduce $NO_x$ in the exhaust gas. The SCR system includes an SCR catalyst, a urea tank storing a urea solution, a urea injector injecting the urea solution stored in the urea tank into the SCR catalyst, and a dosing control unit (DCU) controlling and monitoring the urea injector. The DCU controls a urea injection amount on the basis of an ammonia storage amount map and the amount of $NO_x$ produced.

Recently, an exhaust after-treatment system including an SCR catalyst and an SDPF located upstream of the SCR catalyst has been developed.

The amount of ammonia to be stored in the SDPF and the SCR catalyst may be determined by a substrate temperature of the SDPF and a substrate temperature of the SCR catalyst rather than a temperature of the exhaust gas. The ammonia storage amount is reduced as the temperature of the SDPF and the temperature of the SCR catalyst increase. In order to efficiently reduce $NO_x$ and prevent ammonia slip, the urea injection amount may be adjusted to be smaller as the substrate temperature of the SDPF and the substrate temperature of the SCR catalyst become higher.

The ammonia storage amount map is a map that predicts the amounts of ammonia to be stored in the catalyst depending on substrate temperatures of the SDPF and the SCR catalyst. Since it is difficult to measure an actual substrate temperature of the SDPF and an actual substrate temperature of the SCR catalyst, a model temperature of the catalyst may be utilized. In this model temperature, the substrate temperature of the SDPF and the substrate temperature of the SCR catalyst are predicted by applying the exhaust gas temperature to a physical equation and a physical model.

Meanwhile, since the SDPF is close to an exhaust manifold of an engine and the SCR catalyst is placed in the underfloor of a vehicle, a distance between the SDPF and the SCR catalyst may be relatively long. We have discovered that an inlet temperature of the SDPF, a model temperature of the SDPF, an inlet temperature of the SCR catalyst, and a model temperature of the SCR catalyst may differ from each other. We have also discovered that a representative model temperature may be calculated by applying a correction value to the model temperature of the SDPF and the model temperature of the SCR catalyst, and the ammonia storage amount may be predicted based on the representative model temperature. In the ammonia storage amount map, the representative model temperature and the exhaust gas temperature (the inlet temperature of the SDPF, the inlet temperature of the SCR catalyst, etc.) differ from each other, but difference between the representative model temperature and the exhaust gas temperature lie within a predetermined range.

Due to the high temperature (650° C.~750° C.) immediately after the filter regeneration of the SDPF, the actual substrate temperature of the SDPF and/or the actual substrate temperature of the SCR catalyst may be higher than the exhaust gas temperature, so that the actual substrate temperature of the SDPF and/or the actual substrate temperature of the SCR catalyst may excessively be higher than the representative model temperature in the ammonia storage amount map at that time. We have discovered that in this state, when urea is injected on the basis of the ammonia storage amount map, an actual ammonia storage amount stored in the SDPF and the SCR catalyst may be smaller than the ammonia storage amount predicted from the ammonia storage amount map. In other words, the DCU may determine a urea injection amount lager than a urea injection amount with respect to the actual substrate temperature, and thus ammonia slip may occur. An electronic control unit or engine control unit (ECU) of the vehicle may recognize the occurrence of ammonia slip as SCR catalyst failure, and thus the ECU may turn on an SCR catalyst failure warning lamp even though there is no SCR catalyst failure, resulting in a field claim.

The matters described in the background section are provided to assist in understanding the background of the present disclosure, and may include any technical concept which is not considered as the prior art known to those skilled in the art.

SUMMARY

The present disclosure addresses the above-mentioned problems occurring in the prior art while advantages achieved by the prior art are maintained intact.

An aspect of the present disclosure provides a urea injection control method in an exhaust after-treatment system, capable of reducing or preventing the occurrence of ammonia slip immediately after filter regeneration.

According to an aspect of the present disclosure, a urea injection control method in an exhaust after-treatment system having a selective catalytic reduction (SCR) catalyst, a filter located upstream of the SCR catalyst, a dosing module injecting urea to the SCR catalyst, and a dosing control unit controlling the dosing module may include: performing ammonia slip prevention logic that adjusts a urea injection amount based on the highest temperature during a predetermined period of time from an end point of filter regeneration to a thermal equilibrium point when a temperature of the SCR catalyst is higher than or equal to a predetermined threshold temperature at the end point of the filter regeneration; and adjusting a urea injection amount based on an ammonia storage amount map when the temperature of the SCR catalyst is lower than or equal to the predetermined threshold temperature at the end point of the filter regeneration, wherein the thermal equilibrium point may be a point at which a temperature of the filter is close or equal to an exhaust gas temperature as the temperature of the filter approaches or converges the exhaust gas temperature.

The filter may be a diesel particulate filter with SCR coating (SDPF). The ammonia storage amount map may include map data, in which an ammonia storage amount is defined depending on an inlet temperature of the SDPF, an inlet temperature of the SCR catalyst, a model temperature of the SDPF, a model temperature of the SCR catalyst, and a representative model temperature. The model temperature of the SDPF may be a substrate temperature of the SDPF which is calculated based on the inlet temperature of the SDPF, the model temperature of the SCR catalyst may be a substrate temperature of the SCR catalyst which is calculated based on the inlet temperature of the SCR catalyst, and the representative model temperature may be calculated by applying a correction value to an average value of the model temperature of the SDPF and the model temperature of the SCR catalyst.

The ammonia slip prevention logic may adjust the urea injection amount based on the highest temperature among the inlet temperature of the SDPF, the model temperature of the SDPF, the inlet temperature of the SCR catalyst, the model temperature of the SCR catalyst, and the representative model temperature.

The ammonia slip prevention logic may adjust the urea injection amount based on the model temperature of the SDPF.

The method may further include calculating an amount of ammonia stored in the SDPF and the SCR catalyst at the end point of the filter regeneration, and the urea injection amount may be adjusted when the calculated ammonia storage amount is smaller than a required ammonia storage amount.

The injection of urea may be stopped when the calculated ammonia storage amount is larger than the required ammonia storage amount.

According to another aspect of the present disclosure, a urea injection control method in an exhaust after-treatment system having a selective catalytic reduction (SCR) catalyst, a filter located upstream of the SCR catalyst, a dosing module injecting urea to the SCR catalyst, and a dosing control unit controlling the dosing module may include: calculating an inflow amount of $NO_x$ flowing into the SCR catalyst, and performing ammonia slip prevention logic that adjusts a urea injection amount to be equal to the inflow amount of $NO_x$ during a predetermined period of time from an end point of filter regeneration to a thermal equilibrium point, when a temperature of the SCR catalyst is higher than or equal to a predetermined threshold temperature at the end point of the filter regeneration; and adjusting a urea injection amount based on an ammonia storage amount map when the temperature of the SCR catalyst is lower than or equal to the predetermined threshold temperature at the end point of the filter regeneration, wherein the thermal equilibrium point may be a point at which a temperature of the filter is close or equal to an exhaust gas temperature as the temperature of the filter approaches or converges the exhaust gas temperature.

The filter may be a diesel particulate filter with SCR coating (SDPF). The ammonia storage amount map includes map data, in which an ammonia storage amount is defined depending on an inlet temperature of the SDPF, an inlet temperature of the SCR catalyst, a model temperature of the SDPF, a model temperature of the SCR catalyst, and a representative model temperature. The model temperature of the SDPF may be a substrate temperature of the SDPF which is calculated based on the inlet temperature of the SDPF, the model temperature of the SCR catalyst may be a substrate temperature of the SCR catalyst which is calculated based on the inlet temperature of the SCR catalyst, and the representative model temperature may be calculated by applying a correction value to an average value of the model temperature of the SDPF and the model temperature of the SCR catalyst.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
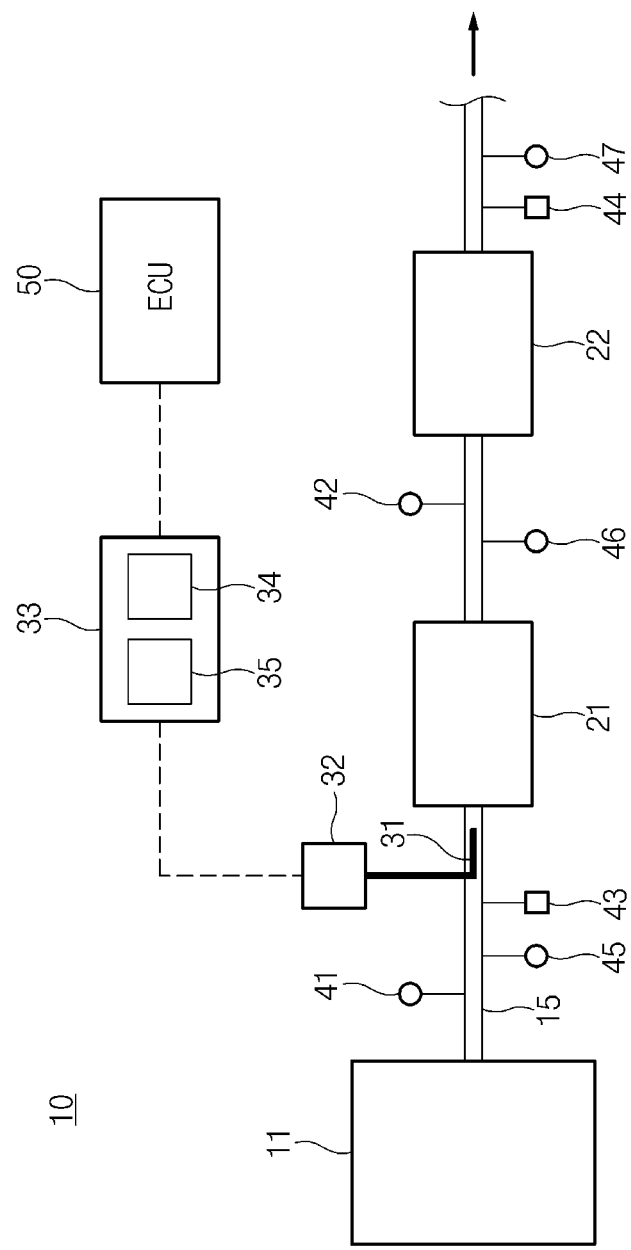
FIG. 1 illustrates the configuration of an exhaust after-treatment system according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These tams are only used to distinguish one element from another element, and the intrinsic features, sequence or order, and the like of the corresponding elements are not limited by the terms. Unless otherwise defined, all terms used herein, including technical or scientific tams, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, an exhaust after-treatment system 10, according to an exemplary form of the present disclosure, may include a filter 21 and a selective catalytic reduction (SCR) catalyst 22 mounted on an exhaust pipe 15 of an engine 11.

The filter 21 may be a diesel particulate filter (DPF) or a DPF with SCR coating (SDPF), capable of removing particulate matter (PM) or soot contained in the exhaust gas. When a differential pressure between an inlet of the filter 21 and an outlet of the filter 21 is higher than or equal to a predetermined value as the amount of PM or soot accumulated in the filter 21 increases, filter regeneration may be performed by burning off the accumulated PM or soot in a regeneration process. A filter regeneration temperature may be relatively high in a range of approximately 650° C. to 750° C.

Throughout the present disclosure, the filter regeneration is defined as the combustion of PM and soot accumulated in DPF or SDPF through fuel post-injection or heating, and the regeneration process is defined as a process of increasing the temperature of the filter 21 through fuel post-injection or heating of a heater (not shown) adjacent to the filter 21.

According to an exemplary form of the present disclosure, the filter 21 may be an SDPF 21 in which a DPF is coated with an SCR catalyst (typically, Cu-zeolite or Fe-zeolite). The SDPF 21 may be a closed coupled SDPF which is disposed close to an exhaust manifold of the engine 11. Hereinafter, reference numeral "21" indicates "SDPF".

The SCR catalyst 22 may be an underfloor SCR catalyst which is placed in the underfloor of a vehicle.

A first temperature sensor 41 may be disposed close to the inlet of the SDPF 21, and the first temperature sensor 41 may measure a temperature of the exhaust gas flowing into the inlet of the SDPF 21, i.e., an inlet temperature of the SDPF 21.

A second temperature sensor 42 may be disposed close to an inlet of the SCR catalyst 22, and the second temperature sensor 42 may measure a temperature of the exhaust gas flowing into the inlet of the SCR catalyst 22, i.e., an inlet temperature of the SCR catalyst 22.

A first $NO_x$ sensor 43 may be disposed close to the inlet of the SDPF 21, and the first $NO_x$ sensor 43 may measure an amount of $NO_x$ flowing into the inlet of the SDPF 21.

A second $NO_x$ sensor 44 may be disposed close to an outlet of the SCR catalyst 22, and the second $NO_x$ sensor 44 may measure an amount of $NO_x$ emitted from the outlet of the SCR catalyst 22.

A first pressure sensor 45 may be disposed close to the inlet of the SDPF 21, a second pressure sensor 46 may be disposed between the outlet of the SDPF 21 and the inlet of the SCR catalyst 22, and a third pressure sensor 47 may be disposed close to the outlet of the SCR catalyst 22. A differential pressure between a pressure at the inlet of the SDPF 21 and a pressure at the outlet of the SDPF 21 may be measured by the first pressure sensor 45 and the second pressure sensor 46, and a differential pressure between a pressure at the inlet of the SCR catalyst 22 and a pressure at the outlet of the SCR catalyst 22 may be measured by the second pressure sensor 46 and the third pressure sensor 47.

A dosing module 31 may be disposed at the inlet of the SDPF 21, and a urea tank 32 may be connected to the dosing module 31. Urea stored in the urea tank 32 may be supplied to the dosing module 31, and the dosing module 31 may inject the urea. A dosing control unit may control and monitor the dosing module 31. The first temperature sensor 41, the second temperature sensor 42, the first $NO_x$ sensor 43, and the second $NO_x$ sensor 44 may be electrically connected to the dosing control unit 33.

The dosing control unit 33 may control a urea injection amount on the basis of an ammonia storage amount map and an amount of $NO_x$ produced.

The dosing control unit 33 may include a memory 34 and a processor 35. The processor 35 may be programmed to receive the ammonia storage amount map and execute instructions stored in the memory 34 and/or transmit instructions to the dosing module 31. The memory 34 may store the ammonia storage amount map, and data input from a variety of sensors. The memory 34 may be a data storage such as a hard disk drive, a solid state drive, a server, a volatile storage medium, or a non-volatile storage medium.

The dosing control unit 33 may control the dosing module 31 on the basis of the ammonia storage amount map, the amounts of NOx flowing into the respective catalysts 21 and 22, the exhaust gas temperature, and the like to adjust the urea injection amount.

The dosing control unit 33 may be electrically connected to an electronic control unit or engine control unit (ECU) 50, and cooperate with the ECU 50.

The ECU 50 may control the engine 11 and a variety of actuators associated with the engine 11. The ECU 50 may control the variety of actuators (a fuel supply system, a fuel injector, a variable valve timing mechanism, etc.) associated with the engine 11. The ECU 50 may include a processor and a memory. The processor may be programmed to execute instructions stored in the memory and transmit instructions to the actuators. The memory may be a data store such as a hard disk drive, a solid state drive, a server, a volatile storage medium, or a non-volatile storage medium.

When the ECU 50 determines that the differential pressure between the pressure at the inlet of the SDPF 21 and the pressure at the outlet of the SDPF 21 measured by the first pressure sensor 45 and the second pressure sensor 46 is higher than or equal to a predetermined threshold differential pressure, the ECU 50 may increase the temperature of the exhaust gas through fuel post-injection or the like, so that the filter regeneration for burning off PM and soot accumulated in the SDPF 21 may be performed.

The dosing control unit 33 may control the injection of urea on the basis of the ammonia storage amount map, the exhaust gas temperature, the $NO_x$ inflow amount, and the like.

Figure 2:
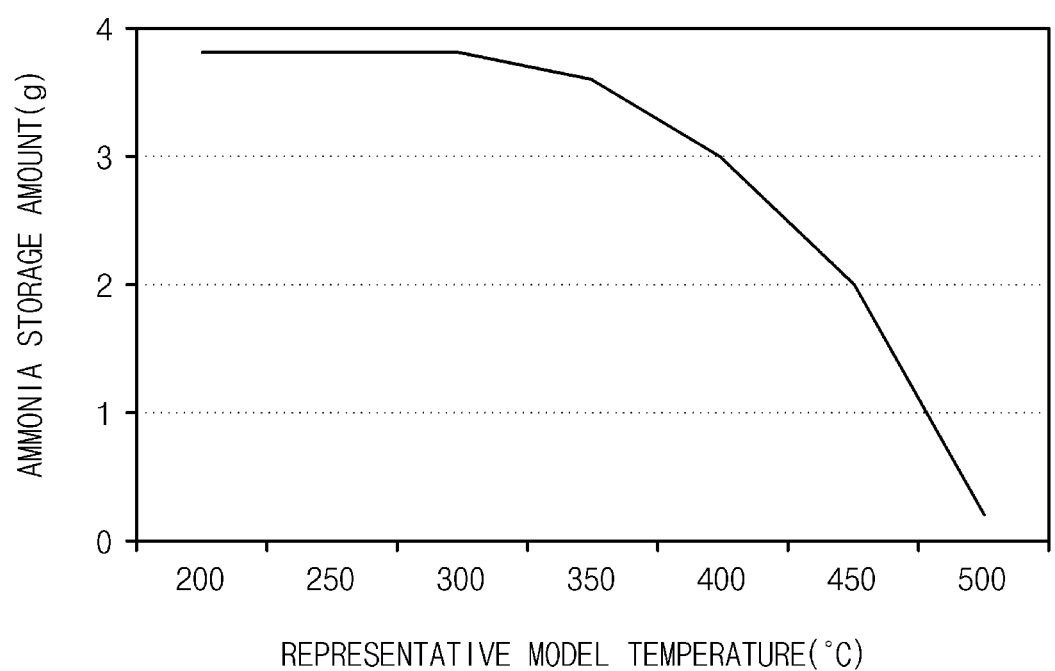
FIG. 2 illustrates a graph of an ammonia storage amount map which is used in an exhaust after-treatment system according to an exemplary form of the present disclosure.

FIG. 2 illustrates a graph of an ammonia storage amount map stored in the memory 34 of the dosing control unit 33 in the exhaust after-treatment system 10 according to an exemplary form of the present disclosure.

Since it is difficult to measure the temperature of the SDPF 21 and the temperature of the SCR catalyst 22, the dosing control unit 33 may control an ammonia storage amount required in the SDPF 21 and the SCR catalyst 22 using the ammonia storage amount map.

The ammonia storage amount map may be a map in which ammonia storage amounts, that is, the amounts of ammonia to be stored in the respective catalysts 21 and 22, are defined depending on model temperatures of the SDPF 21, model temperatures of the SCR catalyst 22, inlet temperatures of the SDPF 21, inlet temperatures of the SCR catalyst 22, and the like. The model temperature of the SDPF 21 may be calculated by applying the inlet temperature of the SDPF 21 to a physical equation. The model temperatures of the SDPF 21 may be substrate temperatures of the SDPF 21 predicted depending on the respective inlet temperatures of the SDPF 21. The model temperature of the SCR catalyst 22 may be calculated by applying the inlet temperature of the SCR catalyst 22 to a physical equation. The model temperatures of the SCR catalyst 22 may be substrate temperatures of the SCR catalyst 22 predicted depending on the respective inlet temperatures of the SCR catalyst 22.

According to an exemplary form of the present disclosure, since the SDPF 21 is disposed close to the exhaust manifold of the engine and the SCR catalyst 22 is placed in the underfloor of the vehicle, a distance between the SDPF 21 and the SCR catalyst 22 may be relatively long, so that the inlet temperature of the SDPF 21, the model temperature of the SDPF 21, the inlet temperature of the SCR catalyst 22, and the model temperature of the SCR catalyst 22 may differ from each other. Thus, a representative model temperature for the model temperature of the SDPF 21 and the model temperature of the SCR catalyst 22 may be desired. The representative model temperature may be calculated by applying a correction value to an average value of the model temperature of the SDPF 21 and the model temperature of the SCR catalyst 22. Thus, in the ammonia storage amount map, the ammonia storage amounts corresponding to the inlet temperatures of the SDPF 21, the inlet temperatures of the SCR catalyst 22, and the representative model temperatures may be defined.

The ammonia storage amount map in FIG. 2 may include map data defining the ammonia storage amounts to be stored in the SDPF 21 and the SCR catalyst 22 depending on the representative model temperatures. As illustrated in FIG. 2, as the representative model temperature increases, the ammonia storage amount stored in the SDPF 21 and the SCR catalyst 22 may be reduced.

Table 1 illustrates the representative model temperatures with respect to the inlet temperatures of the SDPF 21 and the inlet temperatures of the SCR catalyst 22, and the maximum ammonia storage amounts which are to be stored in the SDPF 21 and the SCR catalyst 22 depending on the representative model temperatures. As illustrated in table 1, the inlet temperature of the SDPF may be higher than the inlet temperature of the SCR catalyst, and the representative model temperature may be lower than the inlet temperature of the SDPF and be higher than the inlet temperature of the SCR catalyst.

TABLE 1

| Representative Model Temperature (° C.) | Inlet Temperature of SDPF (° C.) | Inlet Temperature of SCR Catalyst (° C.) | Maximum NH$_3$ Storage Amount (g) |
|---|---|---|---|
| 250 | 265 | 221 | 10.3 |
| 300 | 328 | 270 | 9.06 |
| 350 | 388 | 331 | 6.26 |
| 400 | 437 | 383 | 3.74 |
| 450 | 483 | 435 | No slip |

Figure 3:
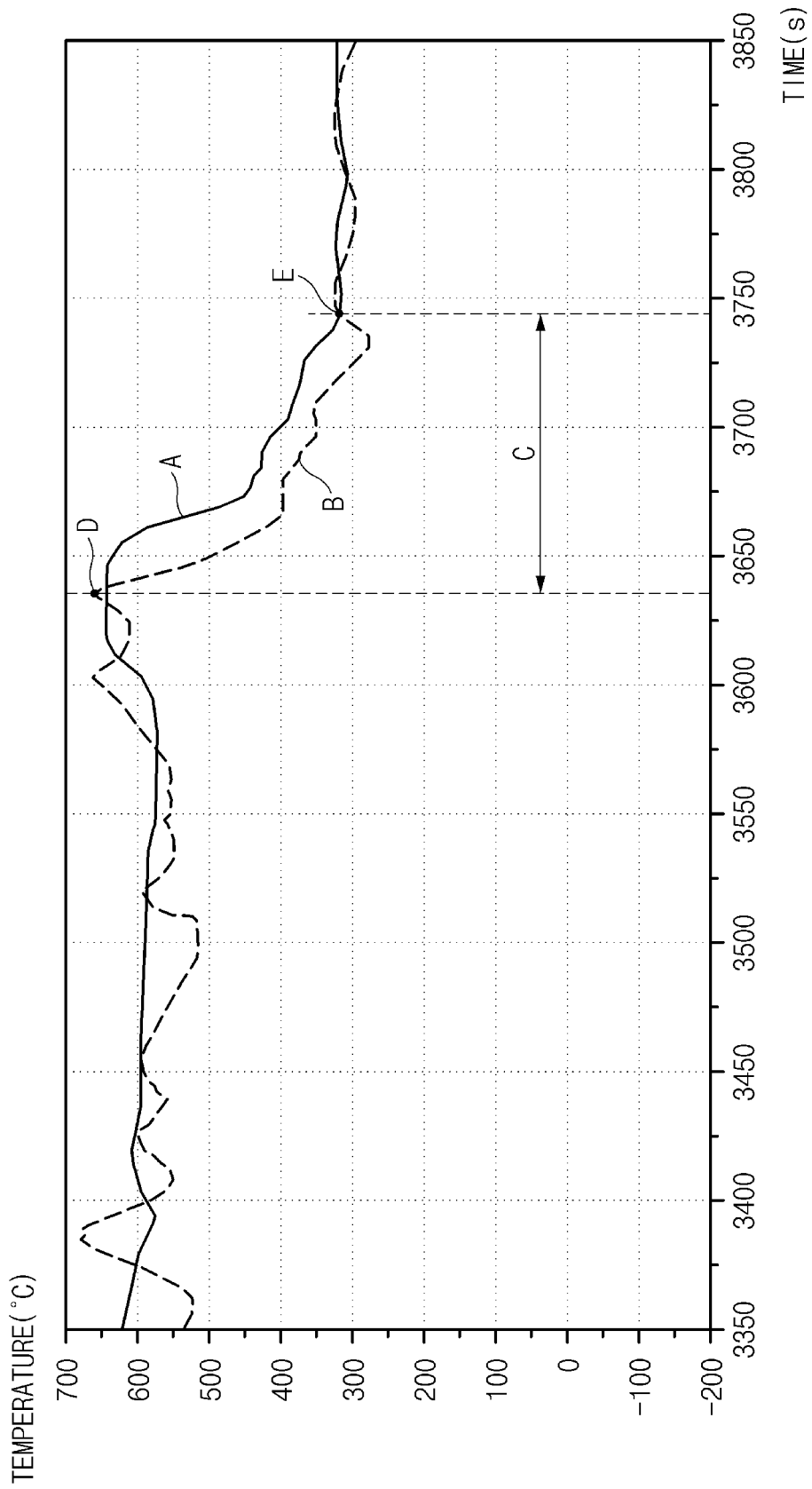
FIG. 3 illustrates a graph of difference between actual substrate temperature of a selective catalytic reduction (SCR) catalyst and temperature of exhaust gas immediately after filter regeneration ends.

As illustrated in FIG. 3, an actual substrate temperature of the SDPF 21 and/or an actual substrate temperature of the SCR catalyst 22 (see line A in FIG. 3) may be excessively higher than an exhaust gas temperature (see line B in FIG. 3) during a predetermined period of time (see period C in FIG. 3) after the end of the filter regeneration of the SDPF 21 (see point D in FIG. 3). When urea is injected in accordance with the representative model temperatures (the ammonia storage amount map in FIG. 2 and table 1) immediately after the filter regeneration ends, the actual substrate temperature of the SDPF 21 and/or the actual substrate temperature of the SCR catalyst 22 may be excessively higher than the representative model temperature so that an ammonia storage amount stored in the SDPF 21 and the SCR catalyst 22 may become smaller than that predicted in the ammonia storage amount map, and thus ammonia slip may occur.

In order to reduce or prevent the ammonia slip at the end of the filter regeneration, the dosing control unit 33 may perform ammonia slip prevention logic from the end point of the filter regeneration (see point D in FIG. 3) to a thermal equilibrium point (see point E in FIG. 3). As illustrated in FIG. 3, the thermal equilibrium point (see point E in FIG. 3) may be a point at which the actual substrate temperature of the SDPF 21 and/or the actual substrate temperature of the SCR catalyst 22 is close or equal to the exhaust gas temperature as the actual substrate temperature of the SDPF 21 and/or the actual substrate temperature of the SCR catalyst converges or approaches the exhaust gas temperature, and the period of time (see period C in FIG. 3) from the end point of the filter regeneration (see point D in FIG. 3) to the thermal equilibrium point (see point E in FIG. 3) may be approximately 100 seconds. Such a period of time (see period C in FIG. 3) may be mapped or predetermined on the basis of the actual substrate temperature of the SDPF 21 and/or the actual substrate temperature of the SCR catalyst 22 measured immediately after the filter regeneration ends, the exhaust gas temperature, and the like.

According to a first exemplary form, the ammonia slip prevention logic may be logic that controls a urea injection amount based on the highest temperature among the inlet temperature of the SDPF 21, the inlet temperature of the SCR catalyst 22, the model temperature of the SDPF 21, the model temperature of the SCR catalyst 22, and the representative model temperature in the period of time (see period C in FIG. 3) from the end point of the filter regeneration (see point D in FIG. 3) to the thermal equilibrium point (see point E in FIG. 3). Specifically, since the SDPF 21 is located upstream of the SCR catalyst 22, the model temperature of the SDPF 21 may be the highest, so that the ammonia slip prevention logic may adjust the urea injection amount based on the model temperature of the SDPF 21. Meanwhile, when the dosing control unit 33 performs the ammonia slip prevention logic according to the first exemplary form, the amount of NO$_x$ flowing into the SDPF 21 and the SCR catalyst 22 may not be taken into account. In other words, the ammonia slip prevention logic according to the first exemplary form may not take into account the amount of purification of $NO_x$ passing through the SDPF 21 and the SCR catalyst 22.

According to a second exemplary form, the ammonia slip prevention logic may be logic that controls a urea injection amount to be equal to the amount of $NO_x$ flowing into the catalysts 21 and 22. That is, it may adjust the urea injection amount such that a ratio of $NO_x$ inflow amount:urea injection amount is 1:1. In other words, the ammonia slip prevention logic according to the second exemplary form may not take into account the ammonia storage amount stored in the SDPF 21 and the SCR catalyst 22.

Figure 4:
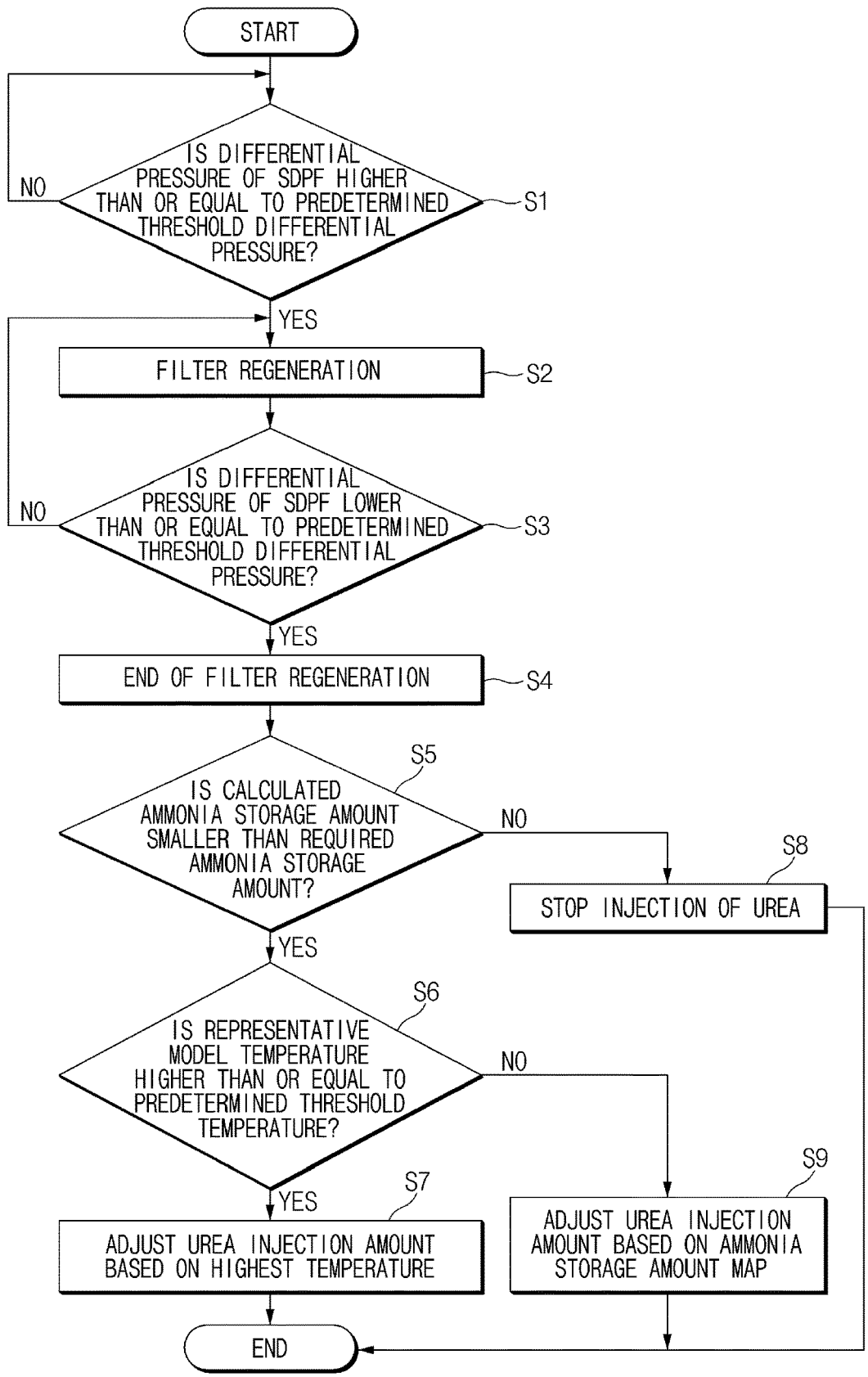
FIG. 4 illustrates a flowchart of a urea injection control method in an exhaust after-treatment system according to a first exemplary form of the present disclosure.

FIG. 4 illustrates a flowchart of a urea injection control method according to a first exemplary form of the present disclosure.

The ECU 50 may determine whether a differential pressure between a pressure at the inlet of the SDPF 21 and a pressure at the outlet of the SDPF 21 measured by the first pressure sensor 45 and the second pressure sensor 46 is higher than or equal to a predetermined threshold differential pressure in operation S1.

When the differential pressure of the SDPF 21 is higher than or equal to the predetermined threshold differential pressure, the ECU 50 may increase the temperature of the SDPF 21 through fuel post-injection or the like so that filter regeneration of the SDPF 21 may be performed in operation S2.

The ECU 50 may determine whether the differential pressure of the SDPF 21 is lower than or equal to the predetermined threshold differential pressure during the filter regeneration of the SDPF 21 in operation S3.

When the differential pressure of the SDPF 21 is lower than or equal to the predetermined threshold differential pressure, the ECU 50 may stop the fuel post-injection so that the filter regeneration may end in operation S4.

When the filter regeneration of the SDPF 21 ends, the dosing control unit 33 may calculate an actual ammonia storage amount stored in the SDPF 21 and the SCR catalyst 22 using the inflow amount and emission amount of $NO_x$ measured by the first and second $NO_x$ sensors 43 and 44, the inlet temperature of the SDPF 21, the inlet temperature of the SCR catalyst 22, and the like, and the dosing control unit 33 may determine whether the calculated ammonia storage amount is smaller than a required ammonia storage amount in operation S5. When the calculated ammonia storage amount is larger than the required ammonia storage amount, the dosing control unit 33 may stop the injection of urea in operation S8.

When the calculated ammonia storage amount is smaller than the required ammonia storage amount, the dosing control unit 33 may determine whether the temperature of the SCR catalyst 22 or the representative model temperature is higher than or equal to a predetermined threshold temperature in operation S6. When the temperature of the SCR catalyst 22 or the representative model temperature is higher than or equal to the predetermined threshold temperature, an actual substrate temperature of the SDPF 21 and/or an actual substrate temperature of the SCR catalyst 22 may be excessively higher than the exhaust gas temperature immediately after the filter regeneration, and when the temperature of the SCR catalyst 22 or the representative model temperature is lower than or equal to the predetermined threshold temperature, the actual substrate temperature of the SDPF 21 and/or the actual substrate temperature of the SCR catalyst 22 may be close or equal to the exhaust gas temperature. For example, the predetermined threshold temperature may be 300° C.~350° C.

When the temperature of the SCR catalyst 22 or the representative model temperature is higher than or equal to the predetermined threshold temperature, the dosing control unit 33 may perform the ammonia slip prevention logic to adjust a urea injection amount based on the highest temperature among the inlet temperature of the SDPF 21, the inlet temperature of the SCR catalyst 22, the model temperature of the SDPF 21, the model temperature of the SCR catalyst 22, and the representative model temperature in operation S7, and the dosing module 31 may inject the adjusted amount of urea so that the occurrence of ammonia slip may be prevented after the end of regeneration of the catalysts 21 and 22. Specifically, since the SDPF 21 is located upstream of the SCR catalyst 22, the model temperature of the SDPF 21 may be the highest, so that the dosing control unit 33 may adjust the urea injection amount based on the model temperature of the SDPF 21. Here, the dosing control unit 33 may not take into account the amount of $NO_x$ flowing into the SDPF 21 and the SCR catalyst 22. In other words, it may not take into account the amount of purification of $NO_x$ passing through the SDPF 21 and the SCR catalyst 22.

When the temperature of the SCR catalyst 22 or the representative model temperature is lower than or equal to the predetermined threshold temperature, the dosing control unit 33 may adjust a urea injection amount in accordance with the ammonia storage amount map based on the representative model temperature, and the dosing module 31 may inject the adjusted amount of urea in operation S9.

According to an alternative form, the ammonia slip prevention logic in operation S7 may be performed during the predetermined time period (see time period C in FIG. 3) from the end point of the filter regeneration (see point D in FIG. 3) to the thermal equilibrium point (see point E in FIG. 3). Instead of operation S6 for determining whether to perform the ammonia slip prevention logic, it may be determined whether a time elapsed from the end of the filter regeneration is within the predetermined time period from the end point of the filter regeneration to the thermal equilibrium point. When the elapsed time from the end of the filter regeneration is within the predetermined time period, the ammonia slip prevention logic may be performed, and when the elapsed time from the end of the filter regeneration is out of the predetermined time period, the ammonia slip prevention logic may end and operation S9 may be performed.

Here, as illustrated in FIG. 3, the thermal equilibrium point (see point E in FIG. 3) may be a point at which the actual substrate temperature of the SDPF 21 and/or the actual substrate temperature of the SCR catalyst 22 close or equal to the exhaust gas temperature as the actual substrate temperature of the SDPF 21 and/or the actual substrate temperature of the SCR catalyst 22 converges or approaches the exhaust gas temperature, and the period of time (see period C in FIG. 3) from the end point of the filter regeneration (see point D in FIG. 3) to the thermal equilibrium point (see point E in FIG. 3) may be approximately 100 seconds.

Figure 5:
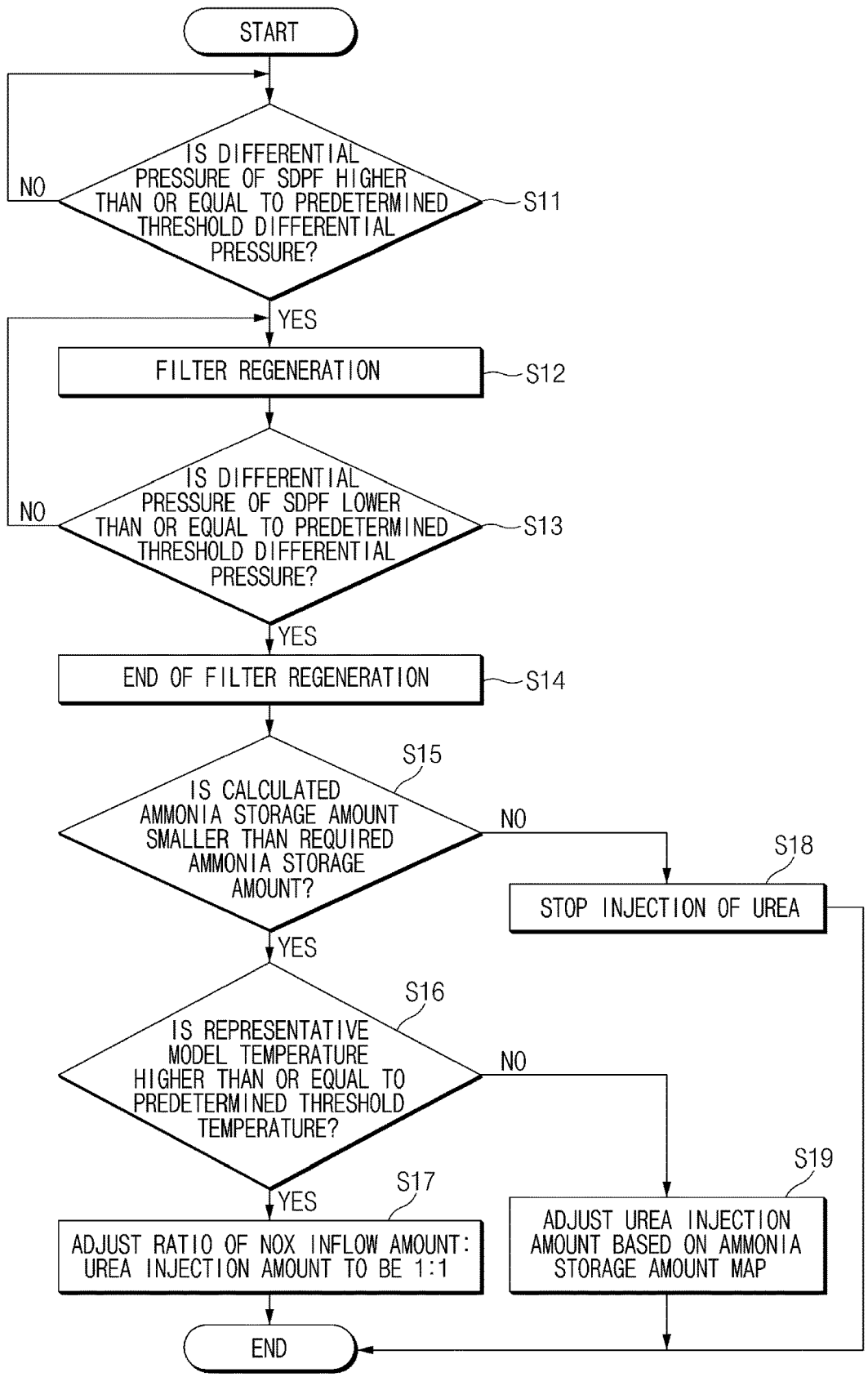
FIG. 5 illustrates a flowchart of a urea injection control method in an exhaust after-treatment system according to a second exemplary form of the present disclosure.

FIG. 5 illustrates a flowchart of a urea injection control method according to a second exemplary form of the present disclosure.

The ECU 50 may determine whether a differential pressure between a pressure at the inlet of the SDPF 21 and a pressure at the outlet of the SDPF 21 measured by the first pressure sensor 45 and the second pressure sensor 46 is higher than or equal to a predetermined threshold differential pressure in operation S11.

When the differential pressure of the SDPF 21 is higher than or equal to the predetermined threshold differential pressure, the ECU 50 may control a fuel injection system of the engine 11 to perform fuel post-injection so that filter regeneration of the SDPF 21 may be performed in operation S12.

The ECU 50 may determine whether the differential pressure of the SDPF 21 is lower than or equal to the predetermined threshold differential pressure during the fuel post-injection in operation S13.

When the differential pressure of the SDPF 21 is lower than or equal to the predetermined threshold differential pressure, the ECU 50 may stop the fuel post-injection so that the filter regeneration of the SDPF 21 may end in operation S14.

When the filter regeneration ends, the dosing control unit 33 may calculate an actual ammonia storage amount stored in the SDPF 21 and the SCR catalyst 22 using the inflow amount and emission amount of $NO_x$ measured by the first and second $NO_x$ sensors 43 and 44, the inlet temperature of the SDPF 21, the inlet temperature of the SCR catalyst 22, and the like, and the dosing control unit 33 may determine whether the calculated ammonia storage amount is smaller than a required ammonia storage amount in operation S15. When the calculated ammonia storage amount is larger than the required ammonia storage amount, the dosing control unit 33 may stop the injection of urea in operation S18.

When the calculated ammonia storage amount is smaller than the required ammonia storage amount, the dosing control unit 33 may determine whether the temperature of the SCR catalyst 22 or the representative model temperature is higher than or equal to a predetermined threshold temperature in operation S16. When the temperature of the SCR catalyst 22 or the representative model temperature is higher than or equal to the predetermined threshold temperature, an actual substrate temperature of the SDPF 21 and/or an actual substrate temperature of the SCR catalyst 22 may be excessively higher than the exhaust gas temperature immediately after the filter regeneration, and when the temperature of the SCR catalyst 22 or the representative model temperature is lower than or equal to the predetermined threshold temperature, the actual substrate temperature of the SDPF 21 and/or the actual substrate temperature of the SCR catalyst 22 may close or equal to the exhaust gas temperature. For example, the predetermined threshold temperature may be 300° C.-350° C.

When the temperature of the SCR catalyst 22 or the representative model temperature is higher than or equal to the predetermined threshold temperature, the dosing control unit 33 may calculate the inflow amount of $NO_x$ flowing into the catalysts 21 and 22, and the dosing control unit 33 may perform the ammonia slip prevention logic to adjust a urea injection amount to be equal to the calculated $NO_x$ inflow amount (S17). Here, the urea injection amount may be adjusted such that a ratio of $NO_x$ inflow amount:urea injection amount is 1:1, and the ammonia slip prevention logic may not take into account the ammonia storage amount stored in the catalysts 21 and 22.

When the temperature of the SCR catalyst 22 or the representative model temperature is lower than or equal to the predetermined threshold temperature, the dosing control unit 33 may adjust a urea injection amount in accordance with the ammonia storage amount map based on the representative model temperature, and the dosing module 31 may inject the adjusted amount of urea in operation S19.

According to an alternative form, the ammonia slip prevention logic in operation S17 may be performed during the predetermined time period (see period C in FIG. 3) from the end point of the filter regeneration (see point D in FIG. 3) to the thermal equilibrium point (see point E in FIG. 3). Instead of operation S16 for determining whether to perform the ammonia slip prevention logic, it may be determined whether a time elapsed from the end of the filter regeneration is within the predetermined time period from the end point of the filter regeneration to the thermal equilibrium point. When the elapsed time from the end of the filter regeneration is within the predetermined time period, the ammonia slip prevention logic may be performed, and when the elapsed time from the end of the filter regeneration is out of the predetermined time period, the ammonia slip prevention logic may end and operation S19 may be performed. Here, as illustrated in FIG. 3, the thermal equilibrium point (see point E in FIG. 3) may be a point at which the actual substrate temperature of the SDPF 21 and/or the actual substrate temperature of the SCR catalyst 22 close or equal to the exhaust gas temperature as the actual substrate temperature of the SDPF 21 and/or the actual substrate temperature of the SCR catalyst 22 converges or approaches the exhaust gas temperature, and the period of time (see period C in FIG. 3) from the end point of the filter regeneration (see point D in FIG. 3) to the thermal equilibrium point (see point E in FIG. 3) may be approximately 100 seconds.

As set forth above, immediately after the filter regeneration ends, the urea injection amount may be adjusted based on the highest temperature, or be adjusted to be equal to the amount of $NO_x$ flowing into the SCR catalyst, and thus the ammonia slip that may occur immediately after the end of the filter regeneration can be reduced or prevented.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A urea injection control method in an exhaust aftertreatment system having a selective catalytic reduction (SCR) catalyst, a filter located upstream of the SCR catalyst, a dosing module injecting urea to the SCR catalyst, and a dosing control unit controlling the dosing module, the method comprising:

performing an ammonia slip prevention logic that adjusts a urea injection amount based on a predetermined temperature during a predetermined period of time from an end point of filter regeneration to a thermal equilibrium point when a temperature of the SCR catalyst is higher than or equal to a predetermined threshold temperature at the end point of the filter regeneration; and adjusting the urea injection amount based on an ammonia storage amount map when the temperature of the SCR catalyst is lower than or equal to the predetermined threshold temperature at the end point of the filter regeneration, wherein:

the thermal equilibrium point is a point at which a temperature of the filter is close or equal to an exhaust gas temperature, the filter is a diesel particulate filter with SCR coating (SDPF), the ammonia storage amount map includes map data, in which an ammonia storage amount is defined based on an inlet temperature of the SDPF, an inlet temperature of the SCR catalyst, a model temperature of the SDPF, a model temperature of the SCR catalyst, and a representative model temperature, the model temperature of the SDPF is a substrate temperature of the SDPF which is calculated based on the inlet temperature of the SDPF, the model temperature of the SCR catalyst is a substrate temperature of the SCR catalyst which is calculated based on the inlet temperature of the SCR catalyst, and the representative model temperature is calculated by applying a correction value to an average value of the model temperature of the SDPF and the model temperature of the SCR catalyst.

2. The method according to claim 1, wherein the predetermined temperature is a highest temperature among the inlet temperature of the SDPF, the model temperature of the SDPF, the inlet temperature of the SCR catalyst, the model temperature of the SCR catalyst, and the representative model temperature.

3. The method according to claim 1, wherein the ammonia slip prevention logic adjusts the urea injection amount based on the model temperature of the SDPF.

4. The method according to claim 1, further comprising calculating an amount of ammonia stored in the SDPF and the SCR catalyst at the end point of the filter regeneration, wherein the urea injection amount is adjusted when the calculated ammonia storage amount is smaller than a required ammonia storage amount.

5. The method according to claim 4, wherein the injection of urea is stopped when the calculated ammonia storage amount is larger than the required ammonia storage amount.

* * * * *